June 5, 1923. 1,458,092
T. WILSON
VEHICLE FRAME SUSPENSION
Filed March 27, 1922
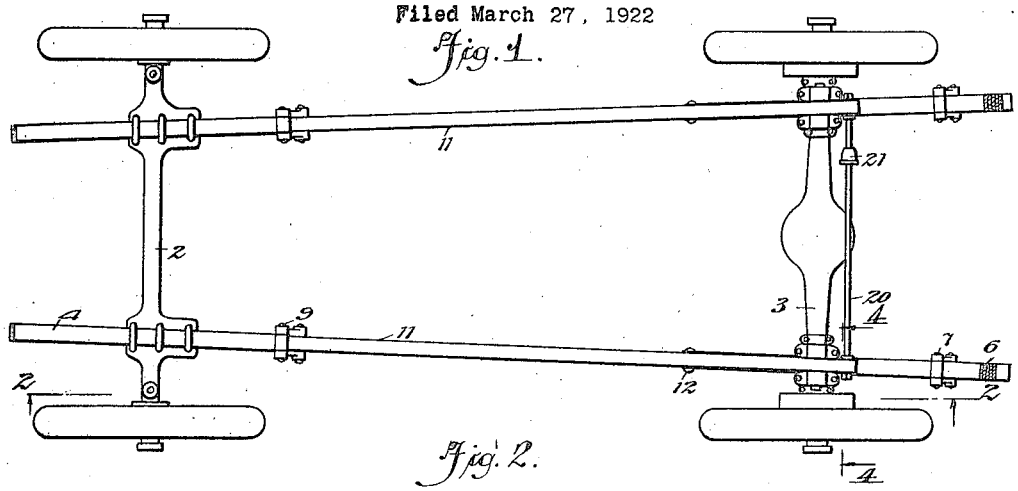
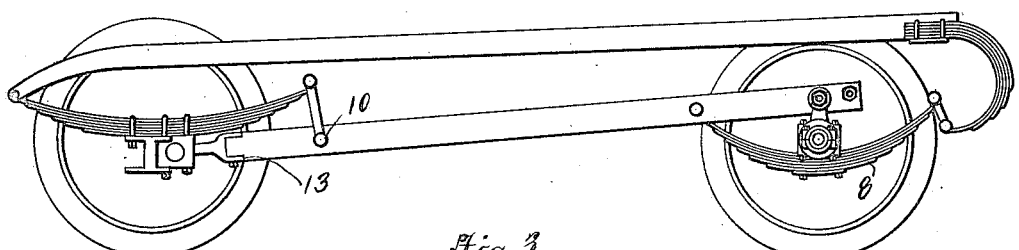
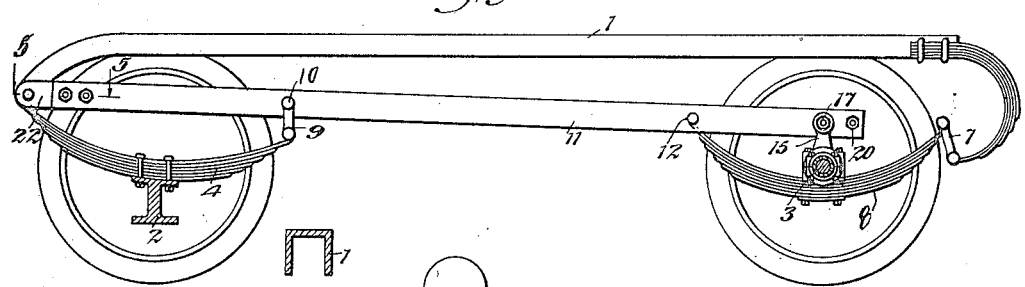
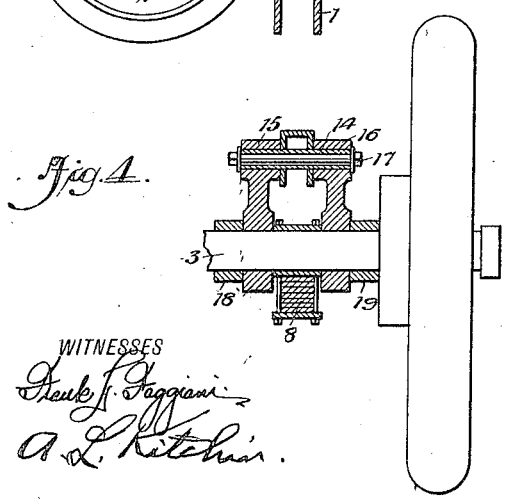
INVENTOR
Thomas Wilson Patented June 5, 1923.

1,458,092

UNITED STATES PATENT OFFICE.

THOMAS WILSON, OF INDIO, CALIFORNIA.

VEHICLE FRAME SUSPENSION.

Application filed March 27, 1922. Serial No. 547,061.

*To all whom it may concern:*

Be it known that I, THOMAS WILSON, a citizen of the United States, and a resident of Indio, in the county of Riverside and State of California, have invented a new and Improved Vehicle Frame Suspension, of which the following is a full, clear, and exact description.

This invention relates to an improved suspension frame for vehicles and particularly to an improvement over my prior Patent No. 1,252,759 wherein the frame may be brought closer to the rear axle and still have the forward and backward movement which is necessary to permit the proper play of the rear springs.

Another object in view is to provide a suspension frame which will bring the frame closer to the rear axle and which will not raise the body of the car higher from the axle than other forms of suspension.

A still further object is to provide a suspension frame for vehicles which will permit a proper resilient action of the springs and which will, at the same time, admit of positioning the body of the car at a minimum height from the axles.

In the accompanying drawing—

Figure 1 is a sectional view through Figure 2 approximately on line 1—1, the same showing one embodiment of the invention as applied to a vehicle.

Figure 2 is a sectional view through Figure 1 approximately on line 2—2.

Figure 3 is a view similar to Figure 2 but showing a slight modified construction.

Figure 4 is a fragmentary sectional view through Figure 1 approximately on line 4—4.

Figure 5 is a detail fragmentary sectional view on line 5—5 of Figure 3, the same being on an enlarged scale.

Referring to the accompanying drawing by numerals, 1 indicates part of the body of a vehicle, which vehicle is provided with a front axle 2 and a rear axle 3. An ordinary half elliptical spring 4 is pivotally connected at 5 in the usual manner to the front of body 1 while a spring 6 is bolted or otherwise rigidly secured to the rear of the body 1 and carries a toggle 7 which is pivotally connected with one end of the half elliptical spring 8. The springs 4 and 8 are clamped respectively to the front and rear axles and, consequently, move up and down with these axles. The rear end of the spring 4 is pivotally connected with a link 9 which in turn is pivotally connected at 10 to the suspension bar 11. As shown in Figure 1 there are two suspension bars 11 with which the accompanying parts form a suspension frame. The bar 11 is pivotally connected at 12 to the front end of the spring 8 and by reason of this arrangement, motion from either of the springs 4 or 8 will be communicated somewhat to the bar 11. The suspension bar 11 is connected at 13 to the front axle 2 preferably by a ball and socket connection while the rear end of the bar 11 is pivotally mounted on a tube 14 (Fig. 4) which tube also extends through the links 15 and 16. A bolt 17 extends through the tube 14 so as to hold the same in place. The opposite ends of the links 15 and 16 to that carrying the tube 14 are pivotally mounted on the axle 3 between the stops 18 and 19 which are secured in place by bolts, set screws or other suitable means. The rear spring 8 is arranged between the links 15 and 16 whereby the links are prevented from wabbling while being allowed a forward and rearward swinging movement, according to the movement of the bar 11.

To assist in holding these bars, a bracing bar 20 is bolted at the respective ends to the respective bars 11, said bar 20 having a universal joint 21 interposed in its length so as to take care of any individual motion of either of the bars 11. This arrangement permits the body 1 to be swung as low as possible and yet allows a free back and forth movement of the suspension bars 11 while the springs 4 and 8 act in the proper manner for providing a resilient support.

In Figures 3 and 5 will be seen a slight modified form of the invention wherein the bars 11 are raised at the front end so that instead of having the ball and socket 13, a yoke 22 extends from the forward part thereof and straddles the forward end of the spring 4 in the body 1 at point 5. If desired, in this form of the invention instead of using the supporting links 15 and 16, bar 11 could be extended to the link 7 and pivoted thereon. If this last structure was used the links 15 would be completely eliminated. In this form of the invention as well as in the preferred form shown in Figure 2, the front end of the rear spring is connected directly to the suspension bar 11 so that when power or movement comes through the rear wheels, the front end of the rear springs when engaged will press directly against the suspension bars 11 without any jerking from any loose connections. This arrangement also prevents any vibration though permitting a proper resilient action.

What I claim is:—

1. In a vehicle suspension of the character described, a pair of suspension bars, means for connecting the front of the rear spring of a vehicle and the rear end of the front spring of a vehicle to said bars intermediate their length, means for pivotally connecting the front ends of said bars in a fixed position with relation to the front spring, and means for swingingly connecting the rear ends of said suspension bars in respect to the rear spring.

2. In a suspension frame for vehicles, provided with a front and rear semi-elliptical spring and front and rear axles connected to the respective springs, a pair of suspension bars, said bars being pivotally connected to the front axle, a link for each of said bars for connecting the same to the rear axle, said links extending substantially normal to the suspension bars, means for connecting the front end of said rear spring to said bars, and means for connecting the rear end of the front spring to said bars, said last mentioned means being in the form of a link.

3. In a suspension of the character described, a pair of suspension bars, articulated means for connecting the bars together at the rear, a link support for supporting each of the bars at the rear, a ball and socket for supporting the bars at the front, and means for connecting one end of the front and rear springs respectively to the respective bars.

4. In a suspension frame for vehicles, a pair of suspension bars and a pair of link supports for each of said bars, said link supports including a hollow journal pin, and a bolt for holding the pin and links in a given position relatively.

5. In a suspension frame of the character described, a pair of suspension bars, a steadying rod connected to said bars at the rear, said steadying rod having an articulated point, and means for connecting one end of the front and rear springs respectively to said suspension bars.

THOMAS WILSON.